United States Patent
Kotecha et al.

(10) Patent No.: US 12,185,158 B2
(45) Date of Patent: *Dec. 31, 2024

(54) METHOD AND SYSTEM FOR APPLICATION-AWARE SCHEDULING SERVICE

(71) Applicant: Verizon Patent and Licensing Inc., Basking Ridge, NJ (US)

(72) Inventors: Lalit R. Kotecha, San Ramon, CA (US); Violeta Cakulev, Millburn, NJ (US); Hossein M. Ahmadi, Parsippany, NY (US); Sudhakar Reddy Patil, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/718,779

(22) Filed: Apr. 12, 2022

(65) Prior Publication Data

US 2022/0240121 A1 Jul. 28, 2022

Related U.S. Application Data

(63) Continuation of application No. 16/943,548, filed on Jul. 30, 2020, now Pat. No. 11,337,106.

(51) Int. Cl.
*H04W 28/02* (2009.01)
*H04L 41/0896* (2022.01)
*H04L 47/2475* (2022.01)
*H04W 8/04* (2009.01)
*H04W 28/084* (2023.01)

(52) U.S. Cl.
CPC ..... *H04W 28/0268* (2013.01); *H04L 41/0896* (2013.01); *H04L 47/2475* (2013.01); *H04W 8/04* (2013.01); *H04W 28/084* (2023.05)

(58) Field of Classification Search
CPC .............. H04W 28/0268; H04W 8/04; H04W 28/0289; H04L 41/0896; H04L 47/2475
See application file for complete search history.

(56) References Cited

U.S. PATENT DOCUMENTS

| | | | |
|---|---|---|---|
| 9,295,065 B2 * | 3/2016 | Dahod | H04L 43/028 |
| 9,680,708 B2 * | 6/2017 | Kasturi | H04L 41/0896 |
| 11,064,425 B1 * | 7/2021 | Cui | H04W 48/18 |
| 11,337,106 B2 * | 5/2022 | Kotecha | H04W 28/0278 |
| 2013/0272121 A1 * | 10/2013 | Stanwood | H04L 47/2475 370/230 |
| 2014/0155043 A1 | 6/2014 | Gell et al. | |
| 2014/0233479 A1 * | 8/2014 | Dahod | H04N 21/6131 370/329 |
| 2016/0212653 A1 | 7/2016 | Wang et al. | |

(Continued)

*Primary Examiner* — Donald L Mills

(57) ABSTRACT

A method, a network device, and a non-transitory storage medium are described in which an application-aware scheduling service is provided. The application-aware scheduling service may be configured with bandwidth values and usability values for traffic of applications. The application-aware scheduling service may manage air interface scheduling based on the bandwidth and usability values. The application-aware scheduling service may perform packet inspection to identify an application relating to traffic. The application-aware scheduling service may be configured with a maximum bandwidth for traffic of applications.

20 Claims, 8 Drawing Sheets

(56) References Cited

U.S. PATENT DOCUMENTS

| | | |
|---|---|---|
| 2017/0289047 A1 | 10/2017 | Szilagyi et al. |
| 2020/0084669 A1* | 3/2020 | Belleschi .......... H04W 72/1236 |
| 2021/0153078 A1 | 5/2021 | Condoluci et al. |
| 2022/0174521 A1* | 6/2022 | Yao ........................ H04L 43/10 |
| 2022/0417803 A1* | 12/2022 | Venkataraman ...... H04W 48/18 |

* cited by examiner

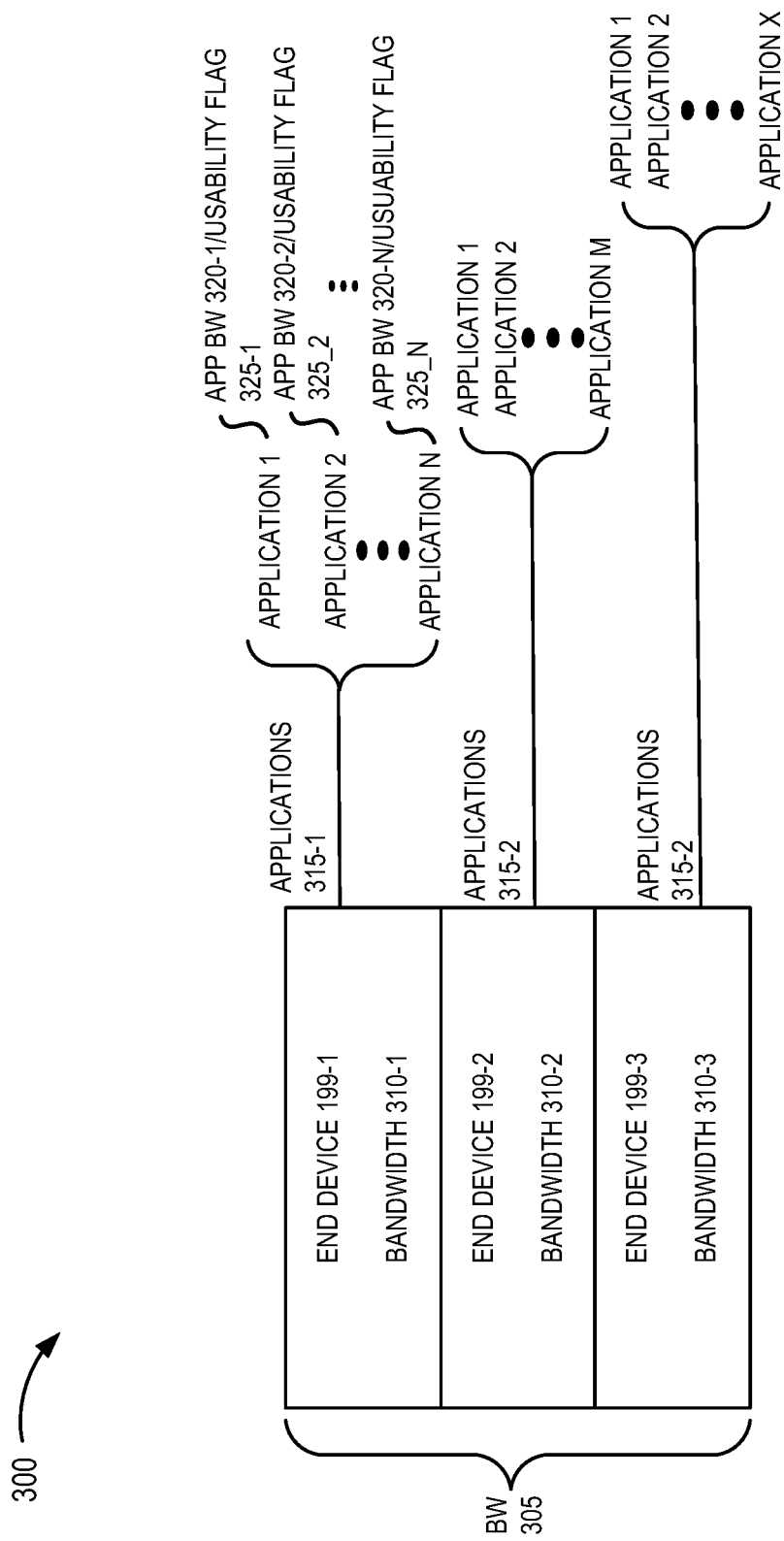

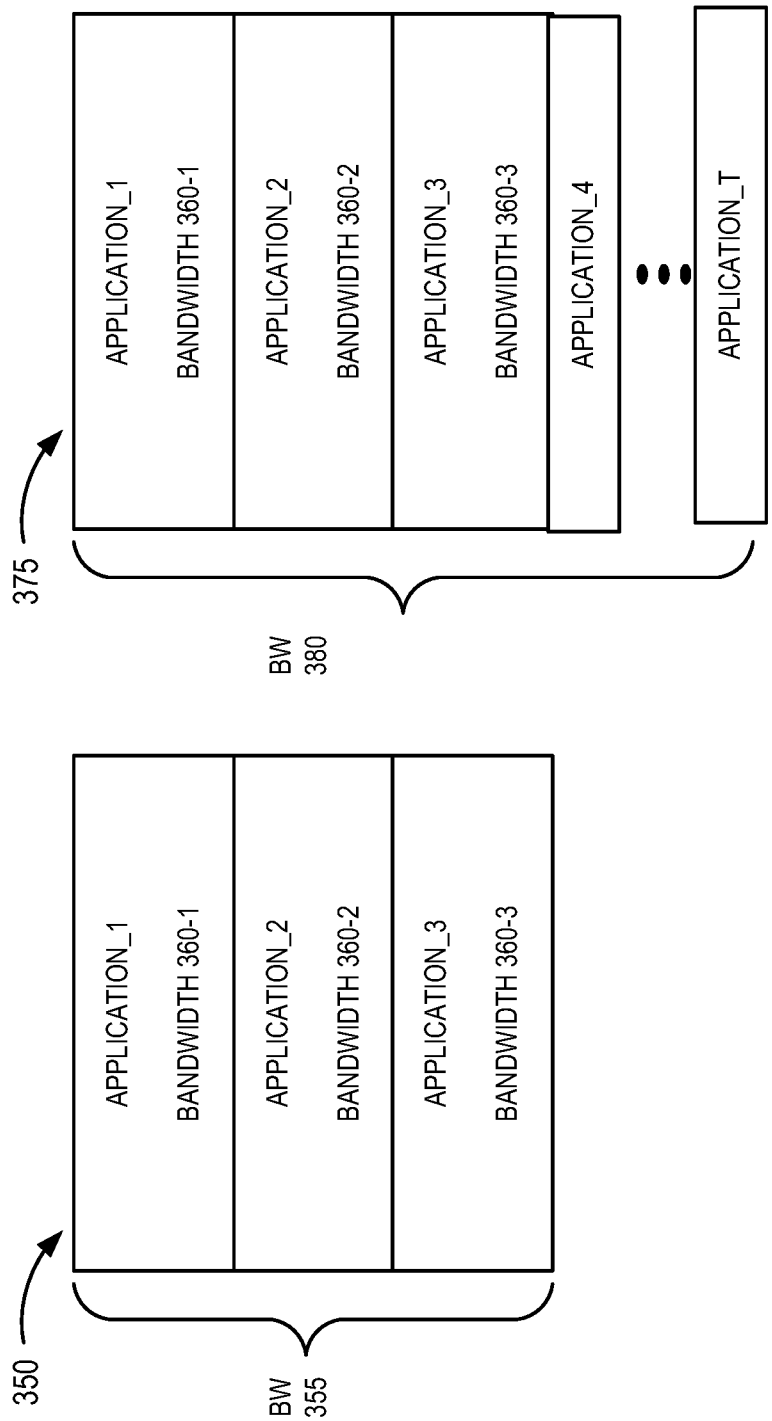

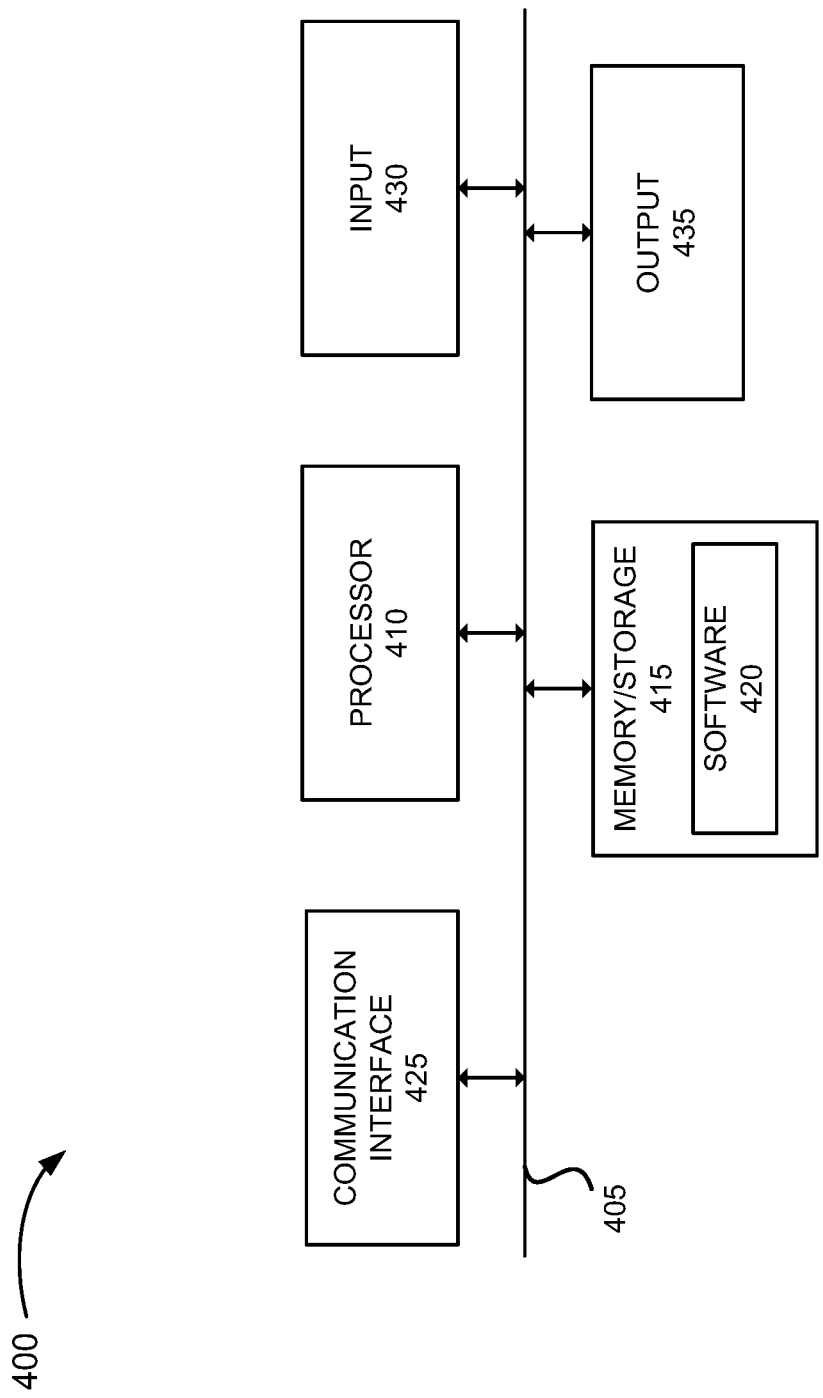

METHOD AND SYSTEM FOR APPLICATION-AWARE SCHEDULING SERVICE

CROSS REFERENCE TO RELATED APPLICATION

This patent application is a continuation of U.S. patent application Ser. No. 16/943,548, entitled "METHOD AND SYSTEM FOR APPLICATION-AWARE SCHEDULING SERVICE" and filed on Jul. 30, 2020, the disclosure of which is incorporated by reference herein in its entirety.

BACKGROUND

Development and design of radio access networks (RANs), core networks, and application service networks, present certain challenges from a network-side perspective and an end device perspective. For example, depending on the configurations from both network-side and end device-side perspectives, such configurations may impact various performance metrics, such as accessibility, congestion, latency, throughput, error rate, or other metric. Accordingly, a need exists to overcome these challenges.

BRIEF DESCRIPTION OF THE DRAWINGS

FIG. 3A is a diagram illustrating an exemplary configuration of an exemplary embodiment of the application-aware scheduling service;

FIG. 3B is a diagram illustrating another exemplary process of an exemplary embodiment of the application-aware scheduling service;

FIG. 3C is a diagram illustrating yet another exemplary process of an exemplary embodiment of the application-aware scheduling service;

FIG. 4 is a diagram illustrating exemplary components of a device that may correspond to one or more of the devices illustrated and described herein;

DETAILED DESCRIPTION

Figure 1:
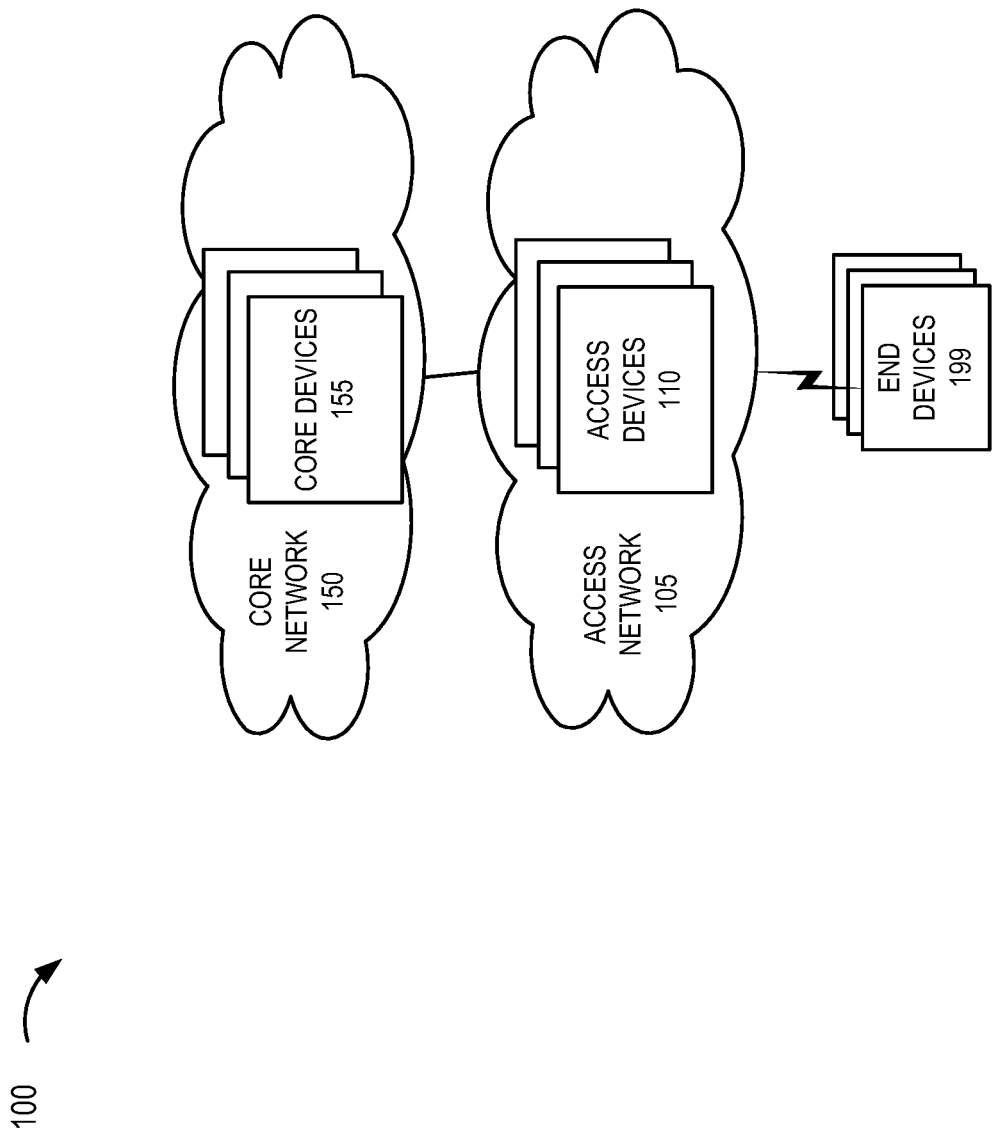
FIG. 1 is a diagram illustrating an exemplary environment in which an exemplary embodiment of an application-aware scheduling service may be implemented.

The following detailed description refers to the accompanying drawings. The same reference numbers in different drawings may identify the same or similar elements. Also, the following detailed description does not limit the invention.

In a wireless network, such as an Internet Protocol wireless network, managing and providing quality of service (QoS) may be fundamental for satisfying a target grade of service for users and end devices. For example, in Fourth Generation (4G) networks, a Quality of Service (QoS) Class Identifier (QCI) is a mechanism that may be used to ensure bearer traffic is allocated appropriate QoS. For example, different bearer traffic may be assigned different QCI values. In Fifth Generation (5G) networks, QoS may be applied on a per flow basis based on 5G QoS Identifiers (5QI).

A part of user traffic in the wireless network may include over-the-top (OTT) application services, such as OTT voice, OTT video telephony, OTT video streaming, OTT instant messaging (IM), or other type of application service. Typically, the OTT service is provided via the Internet and may be subject to "best effort" delivery. Currently, however, there is not a mechanism to provide quality differentiation between different OTT applications for the same user or across different users. Consequently, some users may experience, and/or an OTT application may be subject to, unsatisfactory QoS and poor performance. As such, there are no mechanisms to enhance scheduling at a RAN device to improve quality differentiation among various applications.

According to exemplary embodiments, an application-aware scheduling service for a radio access network is provided. According to an exemplary embodiment, a wireless station of the radio access network may provide the application-aware scheduling service. According to various exemplary embodiments, the application-aware scheduling service may pertain to OTT applications, non-OTT applications, or a combination of OTT applications and non-OTT applications (referred to herein as "applications").

According to an exemplary embodiment, the application-aware scheduling service may allocate, for each user connected to the wireless station, a capacity of the wireless station. According to an exemplary embodiment, the capacity may be a fixed capacity regardless of the number of applications used by the user. According to an exemplary embodiment, the allocated capacity value for each user may be different.

According to an exemplary embodiment, the capacity of the wireless station may be the capacity of a sector of the wireless station. According to other exemplary embodiments, the capacity of the wireless station may be the capacity of a non-sector of the wireless station (e.g., a cell, a sub-sector, an antenna, etc.). According to an exemplary embodiment, the wireless station may perform packet inspection (e.g., deep packet inspection (DPI), deep content inspection, or another type of packet inspection) to identify an application.

According to another exemplary embodiment, the application-aware scheduling service may allocate a fixed capacity for the same application across all users. For example, the fixed capacity may be a portion of the total capacity of the wireless station.

According to yet another exemplary embodiment, the application-aware scheduling service may include a combination of the various embodiments. For example, the application-aware scheduling service may allocate a fixed capacity among users regardless of the number of applications, and the fixed capacity may be different between users. Also, the application-aware scheduling service may allocate a remaining portion of the total capacity among multiple applications. According to an exemplary embodiment, the applications associated with the users of the fixed capacity will not count towards or be applicable to the remaining portion of the total capacity, as provided by the application-aware scheduling service.

In view of the foregoing, the application-aware scheduling service may provide a desired and configurable grade of service for each application without differentiating one user from another. Additionally, the application-aware scheduling service may provide a desired and configurable grade of service for a given application for a given user. In this way, the application-aware scheduling service may prevent or minimize an application that may use a significant amount of network resources from degrading the performance of another OTT application.

FIG. 1 is a diagram illustrating an exemplary environment 100 in which an exemplary embodiment of the application-aware scheduling service may be implemented. As illustrated, environment 100 may include an access network 105 and a core network 150. Access network 105 may include access devices 110, and core network 150 may include core devices 155. Environment 100 may further include end devices 199.

The number, type, and arrangement of networks illustrated in environment 100 are exemplary. Additionally, or alternatively, other networks not illustrated in FIG. 1 may be included in environment 100, such as an xHaul network (e.g., a fronthaul network, a mid-haul network, a backhaul network, etc.), an application layer network, or another type of network.

The number, the type, and the arrangement of network devices in access network 105, and core network 150, as illustrated and described, are exemplary. The number of end devices 199 is exemplary. A network device may be implemented according to one or multiple network architectures (e.g., a client device, a server device, a peer device, a proxy device, a cloud device, a virtualized function, and/or another type of network architecture (e.g., Software Defined Networking (SDN), virtual, logical, network slicing, etc.)). Additionally, a network device may be implemented according to various computing architectures, such as centralized, distributed, cloud (e.g., elastic, public, private, etc.), edge, fog, and/or another type of computing architecture.

Environment 100 includes communication links between the networks, between network devices, and between end device 199 and network devices. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Environment 100 may include various planes of communication including, for example, a control plane, a user plane, a service plane, and/or a network management plane. Environment 100 may include other types of planes of communication. According to various exemplary implementations, the interface of the network device may be a service-based interface, a reference point-based interface, an Open Radio Access Network (O-RAN) interface, a 5G interface, or some other type of interface.

Access network 105 may include one or multiple networks of one or multiple types and technologies. For example, access network 105 may be implemented to include a next generation RAN (e.g., a Fifth Generation (5G) RAN), a future generation RAN (e.g., a Sixth Generation (6G) RAN, etc.), a Fourth Generation (4G) RAN (e.g., an Evolved UMTS Terrestrial Radio Access Network (E-UTRAN) of a Long Term Evolution (LTE) network), a 4.5G RAN (e.g., an E-UTRAN of an LTE-Advanced (LTE-A) network), an RAN of an LTE-A Pro network, and/or another type of RAN (e.g., a legacy Third Generation (3G) RAN, etc.). Access network 105 may further include other types of wireless networks, such as a Wi-Fi network, a Worldwide Interoperability for Microwave Access (WiMAX) network, a local area network (LAN), a Bluetooth network, a personal area network (PAN), a Citizens Broadband Radio System (CBRS) network, or another type of wireless network (e.g., an O-RAN Reference Architecture, a virtualized RAN (vRAN), a self-organizing network (SON), etc.). Access network 105 may include a wired network, an optical network, or another type of network that may provide communication with core network 150, for example.

Access network 105 may include different and multiple functional splitting, such as options 1, 2, 3, 4, 5, 6, 7, or 8 that relate to combinations of access network 105 and core network 150 including an EPC network and/or a NG core (NGC) network, or the splitting of the various layers (e.g., physical layer, Media Access Control (MAC) layer, Radio Link Control (RLC) layer, and Packet Data Convergence Protocol (PDCP) layer), plane splitting (e.g., user plane, control plane, etc.), a centralized unit (CU) and a distributed unit (DU), interface splitting (e.g., F1-U, F1-C, E1, Xn-C, Xn-U, X2-C, Common Public Radio Interface (CPRI), etc.) as well as other types of services, such as dual connectivity (DC) or higher (e.g., a secondary cell group (SCG) split bearer service, a MCG split bearer, an SCG bearer service, E-UTRA-NR (EN-DC), NR-E-UTRA-DC (NE-DC), NG RAN E-UTRA-NR DC (NGEN-DC), or another type of DC (e.g., multi-radio access technology (RAT) (MR-DC), single-RAT (SR-DC), etc.), carrier aggregation (CA) (e.g., intra-band, inter-band, contiguous, non-contiguous, etc.), network slicing, coordinated multipoint (CoMP), various duplex schemes (e.g., frequency division duplex (FDD), time division duplex (TDD), half-duplex FDD (H-FDD), etc.), and/or another type of connectivity service (e.g., NSA) (e.g., non-standalone NR, non-standalone E-UTRA, etc.), SA (e.g., standalone NR, standalone E-UTRA, etc.), etc.).

According to various exemplary embodiments, access network 105 may be implemented to include various architectures of wireless service, such as, for example, macrocell, microcell, femtocell, picocell, metrocell, NR cell, LTE cell, non-cell, or another type of architecture. Additionally, according to various exemplary embodiments, access network 105 may be implemented according to various wireless technologies (e.g., RATs, etc.), wireless standards, wireless frequencies/bands/carriers (e.g., centimeter (cm) wave, millimeter (mm) wave, below 6 GHz, above 6 GHz, licensed radio spectrum, unlicensed radio spectrum, NR low band, NR mid-band, NR high band, etc.), and/or other attributes of radio communication.

Depending on the implementation, access network 105 may include one or multiple types of network devices, such as access devices 110. For example, access devices 110 may include a next generation Node B (gNB), an evolved Node B (eNB), an evolved Long Term Evolution (eLTE) eNB, a radio network controller (RNC), a remote radio head (RRH), a radio unit (RU), a baseband unit (BBU), a CU, a DU, a small cell node (e.g., a picocell device, a femtocell device, a microcell device, a home eNB, etc.), open network devices (e.g., O-RAN Centralized Unit (O-CU), O-RAN Distributed Unit (O-DU), O-RAN next generation Node B (O-gNB), O-RAN evolved Node B (O-eNB, etc.), a future generation wireless access device (e.g., a 6G wireless station), another type of wireless node (e.g., a WiMax device, a hotspot device, a Wi-Fi device, in-building distributed antenna systems (iDAS), outdoor DAS (oDAS), 5G ultra-wide band (UWB) nodes, Citizens Broadcast Radio Service (CBRS)

nodes, Licensed Assisted Access (LAA) nodes, C-band nodes, etc.) that provides a wireless access service. According to some exemplary implementations, access devices 110 may include a combined functionality of multiple RATs (e.g., 4G and 5G functionality, etc.). Access devices 110 may be an indoor device or an outdoor device.

According to various exemplary implementations, access device 110 may include one or multiple sectors or antennas. The antenna may be implemented according to various configurations, such as single input single output (SISO), single input multiple output (SIMO), multiple input single output (MISO), multiple input multiple output (MIMO), massive MIMO, three dimensional (3D) beamforming (also known as full-dimensional MIMO), 2D beamforming, antenna spacing, tilt (relative to the ground), radiation pattern, directivity, elevation, planar arrays, and so forth.

According to an exemplary embodiment, one or multiple types of access devices 110 may include logic that provides the application-aware scheduling service, as described herein.

Core network 150 may include one or multiple networks of one or multiple types and technologies. According to an exemplary embodiment, core network 150 includes a complementary network of access network 105. For example, core network 150 may be implemented to include a 5GC network (also known as next generation core (NGC) network), a future generation core network (e.g., a 6G core network, etc.), an EPC of an LTE network, an LTE-Advanced (LTE-A) network, and/or an LTE-A Pro network. Core network 150 may include a legacy core network.

Depending on the implementation, core network 150 may include various types of network devices, such as core devices 155. For example, core devices 155 may include a user plane function (UPF), a Non-3GPP Interworking Function (N3IWF), an access and management mobility function (AMF), a session management function (SMF), a unified data management (UDM) device, a unified data repository (UDR) device, an authentication server function (AUSF), a network slice selection function (NSSF), a network repository function (NRF), a policy control function (PCF), a binding support function (BSF), a network data analytics function (NWDAF), a network exposure function (NEF), a lifecycle management (LCM) device, an application function (AF), a mobility management entity (MME), a packet gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS). According to other exemplary implementations, core devices 155 may include additional, different, and/or fewer network devices than those described. For example, core devices 155 may include a non-standard or a proprietary network device, and/or another type of network device that may be well-known but not particularly mentioned herein. Core devices 155 may also include a network device that provides a multi-RAT functionality (e.g., 4G and 5G), such as an SMF with PGW control plane functionality (e.g., SMF+PGW-C), a UPF with PGW user plane functionality (e.g., UPF+PGW-U), a service capability exposure function (SCEF) with a NEF (SCEF+NEF), and/or other combined nodes (e.g., an HSS with a UDM and/or UDR, an MME with an AMF, etc.). Access network 105 and/or core network 150 may include a public network, a private network, and/or an ad hoc network.

End devices 199 may include devices that have computational and wireless communicative capabilities. Depending on the implementation, end device 199 may be a mobile device, a portable device, a stationary device, a device operated by a user (e.g., user equipment (UE), etc.), or a device not operated by a user (e.g., an Internet of Things (IoT) device, etc.). For example, end device 199 may be implemented as a smartphone, a mobile phone, a personal digital assistant, a tablet, a netbook, a phablet, a wearable device (e.g., a watch, glasses, etc.), a computer, a device in a vehicle, a gaming device, a music device, an IoT device, or other type of wireless device. End device 199 may be configured to execute various types of software (e.g., applications, programs, etc.). The number and the types of software may vary among end devices 199. According to an exemplary embodiment, end devices 199 may include one or multiple applications. The application(s) may include OTT applications and/or non-OTT applications. An OTT application (or service) may be an application or a service received over the Internet that may not be provided directly by the Internet Service Provider (ISP) of end device 199. Examples of an OTT application may be YouTube®, Hulu®, Neflix®, Skype®, Facetime®, and so forth.

Figure 2:
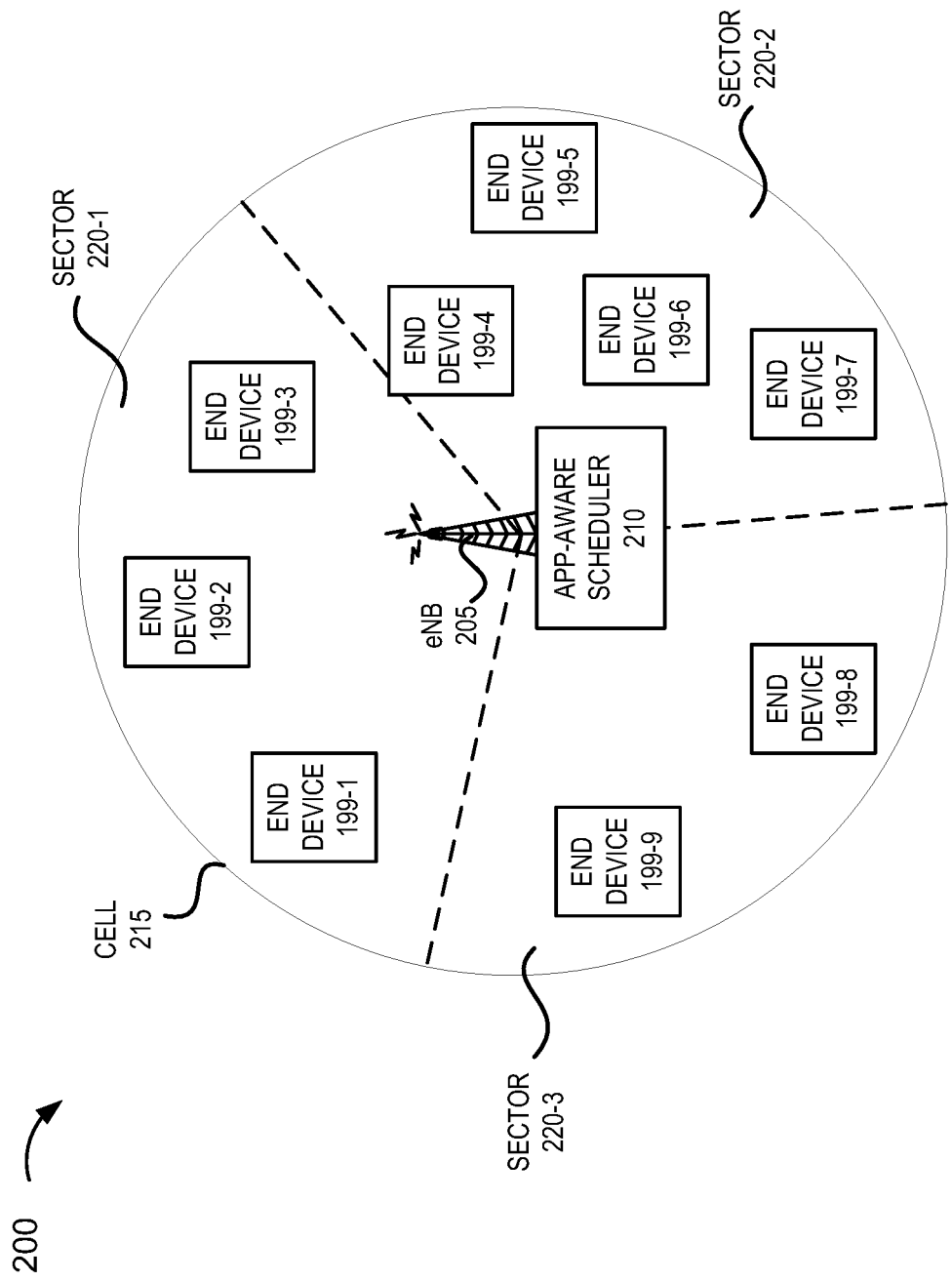
FIG. 2 is a diagram illustrating another exemplary environment in which an exemplary embodiment of the application-aware scheduling service may be implemented according to an exemplary scenario.

FIG. 2 is a diagram illustrating another exemplary environment 200 in which an exemplary embodiment of the application-aware scheduling service may be implemented according to an exemplary scenario. As illustrated, access device 110 (e.g., an eNB 205) provides wireless access to end devices 199-1 through 199-9 (referred to individually or generally as end device 199). eNB 205 includes an application-aware scheduler 210 that provides the application-aware scheduling service, as described herein. According to other exemplary embodiments and scenarios, a different access device 110 (e.g., a gNB, a Wi-Fi device, etc.) may include the application-aware service, as described herein.

FIG. 2 also illustrates a coverage area (e.g., cell 215) of eNB 205 and sectors 220-1 through 220-3 (referred to as sectors 220, and generally or individually as sector 220) coverage areas of eNB 205. According to other exemplary embodiments, access device 110 may not include sectors 220, may include a different number of sectors 220, or may include a different arrangement of sectors 220. According to still other exemplary embodiments, eNB 205 or another type of access device 110 may provide radio coverage according to other configurations (e.g., no sectors, 3D-MIMO, etc.), as described herein. The number of end devices 199 are exemplary.

According to the exemplary scenario, assume that end devices 199 are connected to eNB 205 and traffic may be flowing in the uplink and/or the downlink directions between end devices 199 and eNB 205. According to an exemplary embodiment, the application-aware scheduling service may be based on a capacity of eNB 205. For example, the capacity may be the capacity of sector 220. According to other exemplary scenarios, the capacity may be associated with another coverage area provided by eNB 205 (e.g., an antenna, an array of antennas, all of eNB 205, a portion of eNB 205, a portion of a sector 220, etc.).

According to an exemplary embodiment, the application-aware scheduling service may manage scheduling based on a maximum bandwidth assigned to each end device 199, an application bandwidth assigned to an application, and a usability parameter. According to an exemplary embodiment, eNB 205 or another type of access device 110 may be configured or provisioned with application-aware scheduling service data that may be used by application-aware scheduler 210. The application-aware scheduling service data may be stored in a database or other type of data storage structure. An exemplary configuration 300 is illustrated in FIGS. 3A-3C.

As illustrated in FIG. 3A, configuration 300 includes a bandwidth 305. For example, bandwidth 305 may be a total bandwidth of sector 220 or another configured capacity associated with eNB 205, as described herein. For purposes of description, assume that configuration 300 relates to sector 220-1 that include end devices 199-1, 199-2, and 199-3. As further illustrated, each end device 199 may be assigned a maximum bandwidth 310, such as bandwidth 310-1 for end device 199-1, bandwidth 310-2 for end device 199-2, and bandwidth 310-3 for end device 199-3 (collectively referred to as bandwidths 310, or individually or generally as bandwidth 310). According to various exemplary embodiments, bandwidth 310 may be the same and/or different among end devices 199-1, 199-2, and 199-3. As an example, in 4G RAN, maximum bandwidth 310 may correspond to a UE-Aggregated Maximum Bit Rate (UE-AMBR) value which relates to only non-Guaranteed Bit Rate (GBR) bearers, or an Access Point Name (APN)-AMBR value which relates to only non-GBR bearers and all PDN connections of the same APN. According to other examples, maximum bandwidth may not correspond to the UE-AMBR or the APN-AMBR, and may relate to GBR bearers or a combination of non-GBR bearers and GBR bearers, to an access device 110 of a 5G RAN, and so forth.

Each of end devices 199 may include a set of applications, such as applications 315-1 for end device 199-1, applications 315-2 for end device 199-2, and applications 315-3 for end device 199-3. For example, end device 199-1 may include applications 1 thru N, end device 199-2 may include applications 1 thru M, and end device 199-3 may include applications 1 thru X. The number of applications is exemplary and may vary among end devices 199, as described herein.

As illustrated, configuration 300 may include an application bandwidth 320 for each application or an application bandwidth 320 for a portion of applications included in end device 199. Application bandwidth 320 may indicate a bandwidth value that supports a grade of service for the application. According to various exemplary implementations, the bandwidth value may be a single bandwidth value (e.g., 1 Megabytes/second, or some other bandwidth value) or a range of bandwidth values (e.g., 3 Megabytes/second-3.2 Megabytes/second, or some other range of bandwidth values). According to various exemplary implementations, the grade of service may relate to an optimal grade of service, a satisfactory grade of service, a minimum grade of service, or another configured tier of service for the application.

Also, configuration 300 may include a usability flag 325 for each application bandwidth 320 or a portion of application bandwidth 320. Usability flag 325 may indicate whether the correlated application may work despite application bandwidth 320 not being provided. As an example, a web browsing application or an email application may operate and provide a web browsing service or an email service when a bandwidth is provided that is below application bandwidth 320. As another example, a video streaming service or an audio/video conferencing service may not (effectively) perform or provide a meaningful user experience when a bandwidth is provided that is below application bandwidth 320. As illustrated in FIG. 3A for end device 199-1, for example, application 1 may be assigned an application bandwidth 320-1 and a usability flag 325-1; application 2 may be assigned an application bandwidth 320-2 and a usability flag 325-2; and so forth.

According to an exemplary embodiment, the application-aware scheduling service may perform packet inspection of a packet and identify an application based on the packet inspection. The application-aware scheduling service may perform scheduling based on the identification of the application, as described herein. The scheduling may include the transmission of packets, the receipt of packets, which end device 199 is allocated radio resources, how much radio resources are allocated, rate control, and so forth.

According to various exemplary embodiments, eNB 205 (or other type of access device 110) may perform DPI, deep content inspection, or another type of packet inspection to identify the application. According to various exemplary embodiments, the identification of the application may relate to a category of the application or service (e.g., real-time, non-real-time, augmented reality (AR), critical, IoT, email, browser, an OTT application, a non-OTT application, etc.) or a particular application (e.g., a Netflix® application, etc.). According to an exemplary embodiment, the packet inspection may include identifying an application protocol, an application source port number, an application destination port number, a transport protocol (e.g., Transmission Control Protocol (TCP), User Datagram Protocol (UDP), etc.), a source IP address or range of IP addresses, a destination IP address or range of IP addresses, and/or other types of information included in a packet or a portion of the packet (e.g., a header field, a payload field, a trailer field, etc.).

The application-aware scheduling service may identify other information relating to end device 199, such as unique identifier (e.g., a Media Access Control (MAC) address, an International Mobile Subscriber Identify (IMSI), an IP address, an International Mobile Equipment Identity (IMEI), a 5G-Subscription Permanent Identifier (SUPI) or other type of identifier that may identify end device 199).

FIG. 3A illustrates an exemplary configuration of the application-aware scheduling service, however, according to other embodiments, configuration 300 may include additional parameters, fewer parameters, and/or different parameters than those illustrated in FIG. 3 and described herein.

FIG. 3B is a diagram illustrating another exemplary configuration 350 of an exemplary embodiment of the application-aware scheduling service. Referring to FIG. 3B, a capacity 355 of eNB 205 (or other access device 110) may be divided among applications. According to some exemplary embodiments, capacity 355 may be a total capacity of eNB 205. According to an exemplary embodiment, the applications may be assigned bandwidths across all end devices 199 in which those applications may be prevented from consuming more than their assigned bandwidths. For example, application_1 may be assigned a bandwidth 360-1, application_2 may be assigned a bandwidth 360-2, and application_3 may be assigned a bandwidth 360-3.

FIG. 3C is a diagram illustrating yet another exemplary configuration 375 of an exemplary embodiment of the application-aware scheduling service. Referring to FIG. 3C, a capacity 380 of eNB 205 (or other access device 110) may be divided among applications. According to some exemplary embodiments, capacity 380 may be a total capacity of eNB 205. According to an exemplary embodiment, only some of the applications may be assigned bandwidths across all end devices 199 in which those applications may be prevented from consuming more than their assigned bandwidths. For example, application_1 may be assigned a bandwidth 360-1, application_2 may be assigned a bandwidth 360-2, and application_3 may be assigned a bandwidth 360-3 that prevent application_1, application_2, and application_3 from consuming more than their assigned bandwidth. According to an exemplary embodiment, applications 4-T may not be assigned a bandwidth or may be assigned a bandwidth that may not prevent applications 4-T from consuming more than their assigned bandwidth.

According to some exemplary embodiments, the configuration of the assigned bandwidths may total more than the allocated capacity 355 of eNB 205. For example, referring to FIG. 3B, bandwidth 360-1+bandwidth 360-2+bandwidth 360-3>100% of capacity 355. Alternatively, referring to FIG. 3C, bandwidth 360-1+bandwidth 360-2+bandwidth 360-3+bandwidths for applications 4 through T>100% of capacity 380. According to such embodiments, when all applications with assigned bandwidths are active at the same time, the application-aware scheduling service may pro-rate the bandwidth according to a weight of the application's share so that the bandwidth of the applications does not exceed 100% capacity. Additionally, or alternatively, the application-aware scheduling service my drop packets and/or reduce the bandwidth of an application if the usability flag permits.

FIG. 4 is a diagram illustrating exemplary components of a device 400 that may be included in one or more of the devices described herein. For example, device 400 may correspond to access devices 110, core devices 155, end devices 199, and other types of network devices or logic, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation, or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid-state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, software 420 may include an application that, when executed by processor 410, provides a function of the application-aware scheduling service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service-based interface, etc., as previously described.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures and according to various network architectures (e.g., a virtualized function, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in a network.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process and/or a function, as described herein. Alternatively, for example, according to other implementations, device 400 performs a process and/or a function as described herein based on the execution of hardware (processor 410, etc.).

Figure 5:
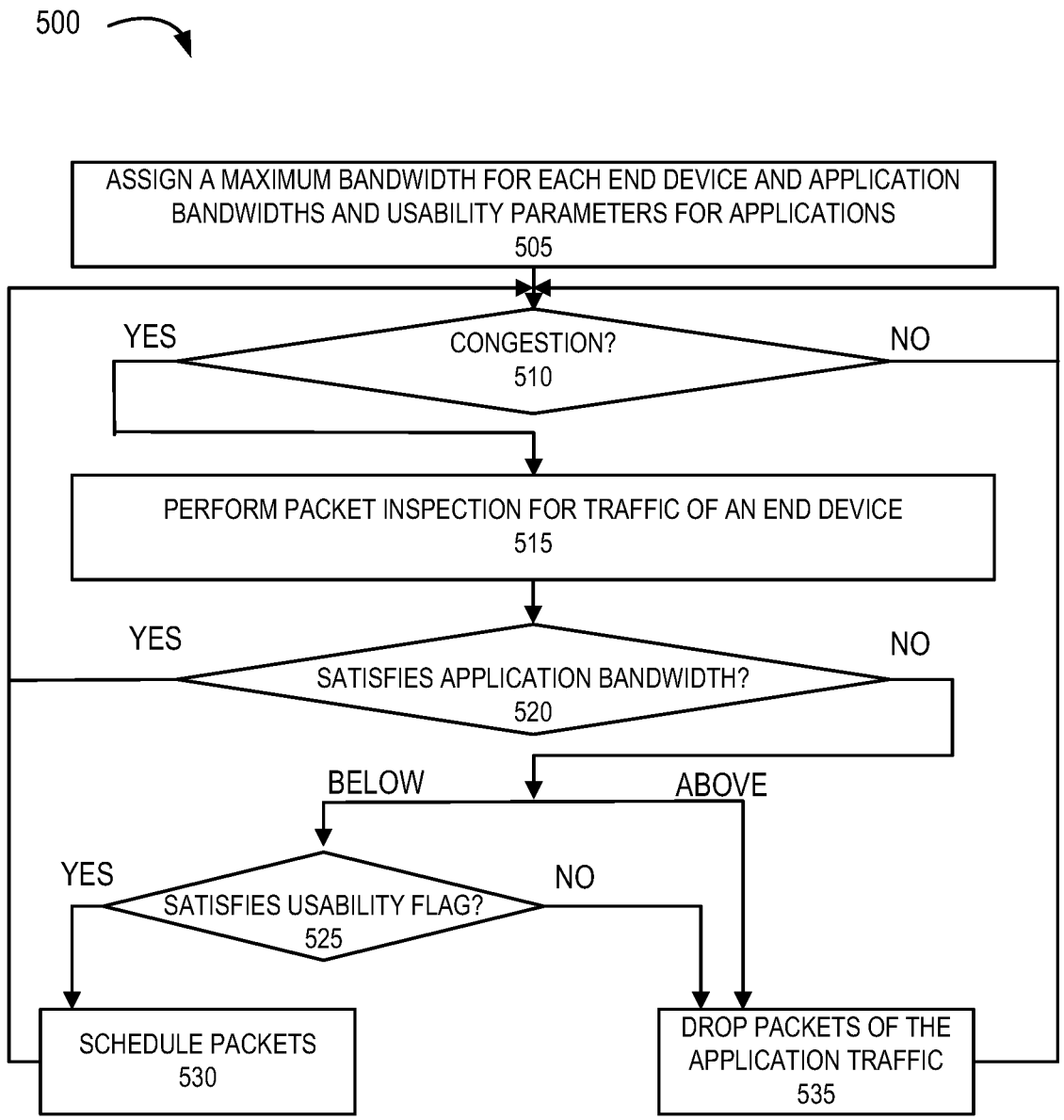
FIG. 5 is a flow diagram illustrating an exemplary process of an exemplary embodiment of the application-aware scheduling service.

FIG. 5 is a flow diagram illustrating an exemplary process 500 of an exemplary embodiment of the application-aware scheduling service. According to an exemplary embodiment, a network device may perform steps of process 500. For example, the network device may be access device 110. According to an exemplary implementation, processor 410 executes software 420 to perform a step illustrated in FIG. 5 and described herein. Alternatively, a step illustrated in FIG. 5 and described herein, may be performed by execution of only hardware. According to an exemplary scenario, process 500 may pertain to end device 199 connected to access device 110 via an air interface.

Referring to FIG. 5, in block 505, access device 110 may assign a maximum bandwidth for each end device 199, and application bandwidths and usability parameters for applications, as described herein. According to an exemplary embodiment, access device 110 may be provisioned with parameters of the application-aware scheduling service, as described herein.

In block 510, access device 110 may determine whether congestion or anticipated congestion is present. For example, access device 110 may identify or determine a current or anticipated load.

When access device 110 determines that there is no congestion (block 510—NO), access device 110 may return to block 510. Additionally, or alternatively, access device 110 may enforce the maximum bandwidth for each end device 199.

When access device 110 determines that there is congestion (block 510—YES), access device 110 may perform packet inspection for traffic of an end device 199 (block 515). Access device 110 may identify traffic of one or multiple applications associated with end device 199. For example, access device 110 may search one or more queues or buffers that store packets.

In block 520, access device 110 may determine whether the application bandwidth is satisfied. For example, access device 110 may compare the assigned bandwidth of the application to the amount of data of the packets identified for the application.

When access device 110 determines that the application bandwidth is satisfied (block 520—YES), process 500 may return to block 510. When access device 110 determines that the application bandwidth is not satisfied (block 520—NO), access device 110 may do one of two things depending on whether the bandwidth of the inspected traffic is above the application bandwidth or below the application bandwidth. As illustrated, when the bandwidth is below the application bandwidth, access device 110 may determine whether the usability flag is satisfied (block 525). For example, the usability flag may indicate whether the application may effectively perform when a bandwidth is below the application bandwidth, as described herein. When the usability flag indicates that the application may effectively perform (block 525—YES), access device 110 may schedule the packets (block 530). For example, access device 110 may schedule the packets for transmission. When the usability flag may indicate that the application may not effectively perform (block 525—NO), access device 110 may drop packets of the application (block 535). For example, access device 110 may drop all of the packets. When the bandwidth is above the application bandwidth, according to various exemplary implementation, access device 110 may drop some or all of the packets (block 535). According to some exemplary implementations, access device 110 may drop a number of packets so that the application bandwidth is satisfied.

FIG. 5 illustrates an exemplary process 500 of the application-aware scheduling service, however, according to other embodiments, process 500 may include additional operations, fewer operations, and/or different operations than those illustrated in FIG. 5 and described herein. For example, process 500 may omit block 510, or blocks 515-530 may not be dependent upon congestion being detected.

Figure 6:
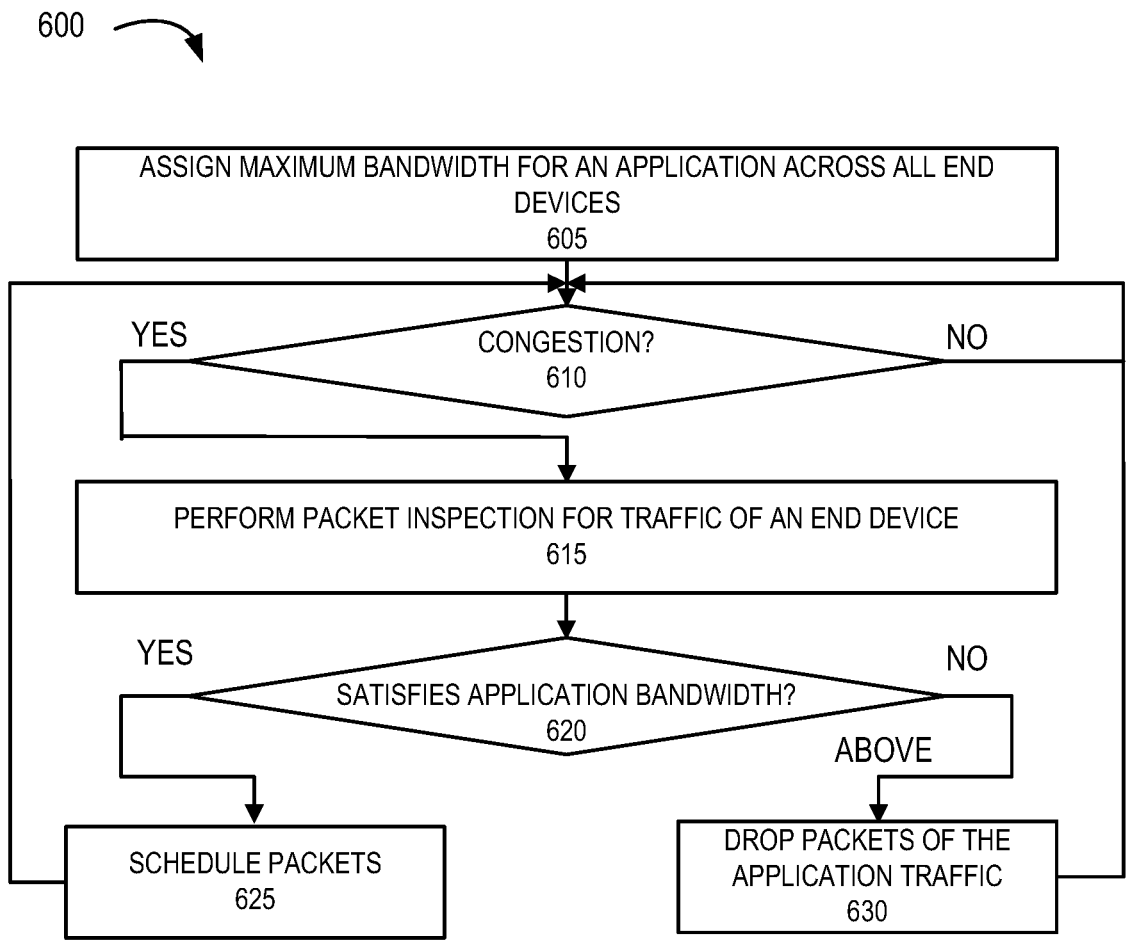
FIG. 6 is a flow diagram illustrating another exemplary process of an exemplary embodiment of the application-aware scheduling service.

FIG. 6 is a flow diagram illustrating another exemplary process 600 of an exemplary embodiment of the application-aware scheduling service. According to an exemplary embodiment, a network device may perform steps of process 600. For example, the network device may be access device 110. According to an exemplary implementation, processor 410 executes software 420 to perform a step illustrated in FIG. 6 and described herein. Alternatively, a step illustrated in FIG. 6 and described herein, may be performed by execution of only hardware.

Referring to FIG. 6, in block 605, access device 110 may assign a maximum bandwidth for an application that applies to all end devices 199 serviced by access device 110, as described herein. According to an exemplary embodiment, access device 110 may be provisioned with parameters of the application-aware scheduling service, as described herein.

In block 610, access device 110 may determine whether congestion or anticipated congestion is present. For example, access device 110 may identify or determine a current or anticipated load.

When access device 110 determines that there is no congestion (block 610—NO), access device 110 may return to block 610. Additionally, or alternatively, in some exemplary embodiments, access device 110 may enforce a maximum bandwidth for each end device 199.

When access device 110 determines that there is congestion (block 610—YES), access device 110 may perform packet inspection for traffic of an end device 199 (block 615). Access device 110 may identify traffic of one or multiple applications associated with end device 199. For example, access device 110 may search one or more queues or buffers that store packets.

In block 620, access device 110 may determine whether the maximum bandwidth for the application is satisfied. For example, access device 110 may compare the maximum bandwidth of the application (e.g., stored application-aware service data) to the amount of data of the packets identified for the application.

When access device 110 determines that the maximum bandwidth is satisfied (block 620—YES), access device 110 may schedule the packets (block 625). For example, access device 110 may schedule the packets for transmission. When access device 110 determines that the maximum bandwidth is not satisfied (block 620—NO), access device 110 may drop packets of the application traffic (block 630). For example, when the amount of data of the identified packets are above the maximum bandwidth, access device 110 may drop all of the packets or a portion of the packets so that the amount of data is commensurate to the maximum bandwidth.

FIG. 6 illustrates an exemplary process 600 of the application-aware scheduling service, however, according to other embodiments, process 600 may include additional operations, fewer operations, and/or different operations than those illustrated in FIG. 6 and described herein. For example, process 600 may omit block 610, or blocks 615-625 may not be dependent upon congestion being detected.

Figure 7:
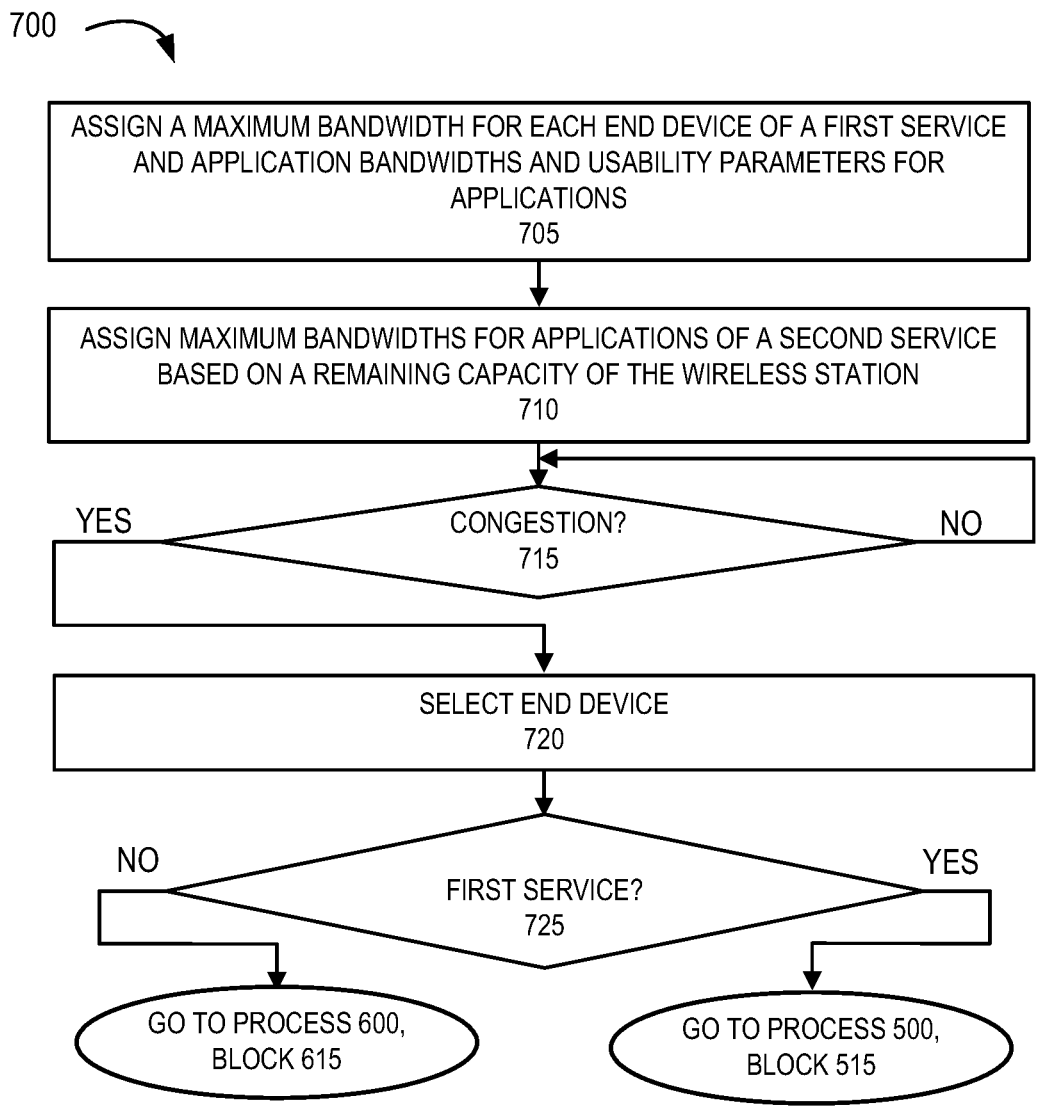
FIG. 7 is a flow diagram illustrating yet another exemplary process of an exemplary embodiment of the application-aware scheduling service.

FIG. 7 is a flow diagram illustrating yet another exemplary process 700 of an exemplary embodiment of the application-aware scheduling service. According to an exemplary embodiment, a network device may perform steps of process 700. For example, the network device may be access device 110. According to an exemplary implementation, processor 410 executes software 420 to perform a step illustrated in FIG. 7 and described herein. Alternatively, a step illustrated in FIG. 7 and described herein, may be performed by execution of only hardware.

According to an exemplary embodiment, process 700 may include a combination of processes 500 and 600, as described herein. For example, x % of a capacity of access device 110 may be associated with a first application-aware scheduling service (e.g., process 500) and a remaining capacity (e.g., 100–x) % may be associated with a second application-aware scheduling service (e.g., process 600). As an example, some end devices 199 connected to access device 110 may be subscribed to the first application-aware scheduling service and other end devices 199 connected to access device 110 may be subscribed to the second application-aware scheduling service. According to an exemplary embodiment, applications of end devices 199 subscribed to the first service may not count towards the capacity allocated for the second service. According to an exemplary embodiment, access device 110 may be provisioned with parameters of the application-aware scheduling service, as described herein.

Referring to FIG. 7, in block 705, access device 705 may assign a maximum bandwidth for each end device of a first service and application bandwidths and usability parameters for application. In block 710, access device 705 may assign maximum bandwidths for applications of a second service based on a remaining capacity of the wireless station.

In block 715, access device 110 may determine whether congestion or anticipated congestion is present. For example, access device 110 may identify or determine a current or anticipated load.

When access device 110 determines that there is no congestion (block 715—NO), access device 110 may return to block 710. Additionally, or alternatively, in some exemplary embodiments, access device 110 may enforce a maximum bandwidth for end device 199 of the first service.

When access device 110 determines that there is congestion (block 715—YES), access device 110 may select an end device 199 for scheduling enforcement (block 720). In block 725, access device 110 may determine whether the selected end device 199 is of the first service or the second service. When access device 110 determines that end device 199 is of the first service (block 725—YES), process 700 may continue starting at block 515 of process 500, as described herein. When access device 110 determines that end device 199 is of the second service (block 725—NO), process 700 may continue starting at block 615 of process 600, as described herein.

FIG. 7 illustrates an exemplary process 700 of the application-aware scheduling service, however, according to other embodiments, process 700 may include additional operations, fewer operations, and/or different operations than those illustrated in FIG. 7 and described herein. For example, process 700 may omit block 715, or block 720 and other blocks may not be dependent upon congestion being detected.

As set forth in this description and illustrated by the drawings, reference is made to "an exemplary embodiment," "an embodiment," "embodiments," etc., which may include a particular feature, structure, or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described regarding the processes illustrated in FIGS. 5, 6, and 7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   storing, by a wireless station of a radio access network prior to an establishment of an application session of an application, data including a parameter indicating whether the application permits a first bandwidth, which does not support a minimum grade of service and is below an application bandwidth, during the application session;
   performing, by the wireless station, packet inspection for traffic of the application associated with an end device;
   determining, by the wireless station, that the application bandwidth is not satisfied; and
   determining, by the wireless station, whether to drop the inspected traffic or schedule a transmission of the inspected traffic based on the parameter.

2. The method of claim 1, further comprising:
   dropping, by the wireless station, the inspected traffic when the first bandwidth is not permitted.

3. The method of claim 1, wherein the application bandwidth indicates a maximum allowable bandwidth to be allocated for the application.

4. The method of claim 1, wherein the data includes a maximum bandwidth, and the method further comprising:
   enforcing, by the wireless station, a maximum bandwidth for the end device, wherein the maximum bandwidth pertains to guaranteed bit rate (GBR) bearers and non-GBR bearers.

5. The method of claim 1, further comprising:
   scheduling, by the wireless station, the transmission of the inspected traffic when the first bandwidth is permitted.

6. The method of claim 1, wherein the application bandwidth indicates a bandwidth value that provides the minimum grade of service for the application.

7. The method of claim 1, wherein the wireless station is an evolved Node B or a next generation Node B.

8. The method of claim 1, wherein determining that the application bandwidth is not satisfied further comprises:
   comparing, by the wireless station, the application bandwidth to a bandwidth associated with the inspected traffic.

9. A network device comprising:
   a processor configured to:
   store, prior to an establishment of an application session of an application, data including a parameter indicating whether the application permits a first bandwidth, which does not support a minimum grade of service and is below an application bandwidth, during the application session;
   perform packet inspection for traffic of the application associated with an end device;
   determine that the application bandwidth is not satisfied; and
   determine whether to drop the inspected traffic or schedule a transmission of the inspected traffic based on the parameter.

10. The network device of claim 9, wherein the processor is further configured to:
    drop the inspected traffic when the first bandwidth is not permitted.

11. The network device of claim 9, wherein the application bandwidth indicates a maximum allowable bandwidth to be allocated for the application.

12. The network device of claim 9, wherein the data includes a maximum bandwidth, and the processor is further configured to:
    enforce, a maximum bandwidth for the end device, wherein the maximum bandwidth pertains to guaranteed bit rate (GBR) bearers and non-GBR bearers.

13. The network device of claim 9, wherein the processor is further configured to:
    schedule the transmission of the inspected traffic when the first bandwidth is permitted.

14. The network device of claim 9, wherein the application bandwidth indicates a bandwidth value that provides the minimum grade of service for the application.

15. The network device of claim 9, wherein the wireless station is an evolved Node B or a next generation Node B.

16. The network device of claim 9, wherein determining that the application bandwidth is not satisfied, the processor is further configured to:
    compare the application bandwidth to a bandwidth value associated with the inspected traffic.

17. A non-transitory computer-readable storage medium storing instructions executable by a processor of a wireless station of a radio access network, which when executed cause the wireless station to:
    store, prior to an establishment of an application session of an application, data including a parameter indicating whether the application permits a first bandwidth, which does not support a minimum grade of service and is below an application bandwidth, during the application session;

perform packet inspection for traffic of the application associated with an end device;

determine that the application bandwidth is not satisfied; and determine whether to drop the inspected traffic or schedule a transmission of the inspected traffic based on the parameter.

18. The non-transitory computer-readable storage medium of claim 17, wherein the instructions further comprise instructions, which when executed cause the wireless station to:

drop the inspected traffic when the first bandwidth is not permitted.

19. The non-transitory computer-readable storage medium of claim 17, wherein the application bandwidth indicates a bandwidth value that provides the minimum grade of service for the application.

20. The non-transitory computer-readable storage medium of claim 17, wherein the instructions further comprise instructions, which when executed cause the wireless station to:

schedule the transmission of the inspected traffic when the first bandwidth is permitted.

\* \* \* \* \*